3,812,039
ELECTROLYTE FOR ELECTROLYTIC
CAPACITOR
Shinichi Niwa, Osaka, Japan, assignor to Sanyo
Electric Co., Ltd., Osaka-fu, Japan
No Drawing. Filed Feb. 25, 1972, Ser. No. 229,572
Claims priority, application Japan, Feb. 25, 1971,
46/9,520; June 30, 1971, 46/48,292; Sept. 1,
1971, 46/67,590
Int. Cl. H01g 9/02
U.S. Cl. 252—62.2                                     2 Claims

ABSTRACT OF THE DISCLOSURE

An electrolyte for electrolytic capacitors which comprises N-methylformamide as a solvent and at least one of ammonium, amine and alkali metal acid maleate as a solute dissolved therein. The electrolyte has a stable, low viscosity and a high conductivity so that an electrolytic capacitor using the same shows a high performance over a wide range of temperature for a long period of time.

---

The present invention relates to an electrolyte for electrolytic capacitors showing a high performance over a wide range of temperature for a long period of time.

With respect to dry electrolytic capacitors, it may be fairly said that their performance is largely dependent upon the kind of the electrolyte used therein. As such electrolyte, there are known various and numerous combinations of solvents and solutes dissolved therein, of which examples are as follows: ethylene glycol-boric acid (Japanese Pat. No. 4,589/54), ethylene glycol-adipic acid (Japanese Pat. No. 14,420/60), dimethylformamide-ionogen (Japanese Pat. No. 3,984/58), dimethylformamide-water-polyvalent alcohol-ionogen (Japanese Pat. No. 3,389/56), etc. Because of the unsatisfactory physico-chemical properties of the solvents and the solutes, however, these known electrolytes cannot provide any electrolytic capacitor of a high and stable performance over a wide range of temperature from low to high temperatures. For instance, the electrolytes using ethylene glycol show a relatively high viscosity, particularly at a low temperature, and their conductivity is not sufficient. Further, for instance, the electrolytes with dimethylformamide tend to lose the solvent at a high temperature in view of the fact that the boiling point of dimethylformamide is relatively low, and the life of an electrolytic capacitor at a high temperature is thus not long.

As the result of the study seeking an electrolyte of a stable, low viscosity and a high conductivity, it has now been found that the use of N-methylformamide (hereinafter referred to as "NMF") as a solvent and a mono salt of a saturated or unsaturated hydrocarbon dicarboxylic acid having not more than 10 carbon atoms as a solute can provide such electrolyte, and an electrolytic capacitor therewith shows a high performance over a wide range of temperature from low to high temperatures for a long period of time.

NMF has a relatively high boiling point (i.e. 180 to 185° C.) and a relatively low viscosity even at a low temperature (i.e. ca. 20 cp.i. at −60° C.). Because of these favorable properties, attempt has been made to use NMF as a solvent for an electrolyte (Japanese Pat. No. 14,420/68). Namely, NMF was used with ammonium salicylate, ammonium citrate or ammonium borate to make an electrolyte for electrolytic capacitors. However, the solubility of these salts in NMF is not sufficient, and the conductivity of the resulting electrolyte is unsatisfactory. Contrary to such known salts, the mono salt of the saturated or unsaturated hydrocarbon dicarboxylic acid having not more than 10 carbon atoms shows a relatively high solubility in NMF and the electrolyte therewith affords a high conductivity. In this connection, it should be noted that the saturated or unsaturated hydrocarbon dicarboxylic acid is utilizable only when in the form of a mono salt, i.e. an acidic salt. In case of a di salt, i.e. a neutral salt, the solubility is not sufficient, and the conductvity of the resultant electrolyte is low.

According to the present invention, an electrolyte for electrolytic capacitors comprising NMF as a solvent and a mono salt of a saturated or unsaturated hydrocarbon dicarboxylic acid having not more than 10 carbon atoms as a solute dissolved therein is provided.

As the mono salt of the saturated or unsaturated hydrocarbon dicarboxylic acid, there may be used the monoammonium, monoamine or monoalkali metal salt. Specifically, the following mono salts are exemplified: monosodium maleate, monopotassium maleate, monoammonium maleate, monoammonium adipate, monopotassium citraconate, monoammonium citraconate, monoammonium isophthalate, monosodium isophthalate, monopotassium isophthalate, etc. Among them, monoammonium maleate and monoammonium citraconate are particularly preferred.

The concentration of the solute in the solvent is not less than 1% by weight and usually not less than 2% by weight. A closer concentration to the saturation is more favorable. The most preferred is a saturated solution of the solute in the solvent.

Although the electrolyte usually consists of NMF and at least one of the mono salts of the saturated or unsaturated hydrocarbon dicarboxylic acids, there may be incorporated any other solvent or additive insofar as the electrical property of the electrolyte is not materially diminished.

The electrolyte of the present invention has, as stated above, a low viscosity without any considerable variation on the change of temperature and shows a high conductivity over a wide range of temperature. When it is used for a dry electrolyte capacitor according to a per se conventional manner, the electrolytic capacitor exhibits a high performance.

Still, it may be noted that a mono salt of maleic acid, particularly monoammonium maleate, is generally of high dissociation so that, even when employed with any solvent other than NMF, the resulting electrolyte is more conductive than any conventional one. Thus, a monoammonium, monoamine or monoalkali metal salt of maleic acid may be used in a solvent such as polyvalent alcohols (e.g. ethylene glycol, propylene glycol), ethers (e.g. ethylene glycol monomethyl ether), formamides (e.g. N-methylformamide, N,N-dimethylformamide) or the like in a concentration of not less than 1% by weight.

Practical and presently preferred embodiments of the present invention are illustratively shown in the following examples.

EXAMPLE 1

Monoammonium maleate (10 g.), prepared by adding two equivalent amounts of maleic acid to a solution of one equivalent amount of ammonia in water, evaporating water from the resultant mixture and drying the resulting product in a desiccator, is dissolved in NMF (100 ml.) at room temperature to make solution, which is utilizable as an electrolyte for an electrolytic capacitor showing a high performance over a wide range of temperature from low to high temperatures as a solid capacitor does.

In the similar manner but replacing monoammonium meleate by any other mono salt of a saturated or unsaturated hydrocarbon dicarboxylic acid, there is obtained the corresponding electrolyte.

The specific resistances of some electrolytes as prepared above are shown in the following Table 1.

TABLE 1

| Solute (g.) | Solvent (ml.) | Specific resistance (Ω cm, at 25° C.) |
|---|---|---|
| Monoammonium adipate (10) | NMF (100) | 250 |
| Monopotassium citraconate (10) | NMF (100) | 130 |
| Monoammonium isophthalate (10) | NMF (100) | 250 |
| Monoammonium maleate (10) | NMF (100) | 72 |

The electric properties of aluminum dry electrolytic capacitors using the electrolytes as prepared above (Sample A: NMF+monoammonium adipate. Sample B: NMF+monopotassium citraconate. Sample C:

NMF+monoammonium isophthalate

Sample D: NMF+monoammonium maleate) and using an electrolyte consisting of ethylene glycol (100 ml.), water (17 ml.) and diammonium adipate (10 g.) as conventionally employed (Sample I) were comparatively examined with a capacitor element of 220 μf.-10 v. (rated). The results are shown in the followings Tables 2, 3 and 4.

TABLE 2.—TEMPERATURE CHARACTERISTICS

| | −25° C. | | +25° C. | | +85° C. | |
|---|---|---|---|---|---|---|
| Electrolyte | Change ratio of capacitance, percent | Tan δ | Change ratio of capacitance, percent | Tan δ | Change ratio of capacitance, percent | Tan δ |
| I | −22.7 | 3.04 | 0 | 0.18 | +17.0 | 0.09 |
| A | −9.7 | 0.65 | 0 | 0.12 | +7.7 | 0.08 |
| B | −8.6 | 0.52 | 0 | 0.11 | +4.8 | 0.07 |
| C | −9.1 | 0.60 | 0 | 0.12 | +6.6 | 0.08 |
| D | −5.8 | 0.25 | 0 | 0.07 | +6.5 | 0.07 |

TABLE 3.—ENDURANCE TEST

| | Initial value | | | Value after 500 hrs. | | |
|---|---|---|---|---|---|---|
| Electrolyte | Capacitance (μf.) | Tan δ | Leakage current (μa./min.) | Change ratio of capacitance, percent | Tan δ | Leakage current (μa./min.) |
| I | 282 | 0.16 | 3.5 | −6.2 | 0.15 | 2.8 |
| A | 310 | 0.14 | 2.3 | −3.2 | 0.11 | 1.5 |
| B | 313 | 0.12 | 2.2 | −5.2 | 0.13 | 2.0 |
| C | 310 | 0.12 | 8.9 | −3.2 | 0.09 | 1.6 |
| D | 320 | 0.07 | 1.5 | −3.1 | 0.10 | 1.3 |

NOTE.—(1) A rated voltage was applied in a thermostatic bath set up at 85° C. (2) Rating of capacitor: 10 v., 220 μf.

TABLE 4.—SHELF TEST

| | Initial value | | | Value after 120 hrs. | | |
|---|---|---|---|---|---|---|
| Electrolyte | Capacitance (μf.) | Tan δ | Leakage current (μa./min.) | Change ratio of capacitance, percent | Tan δ | Leakage current (μa./min.) |
| I | 292 | 0.17 | 2.5 | −2.4 | 0.17 | 52 |
| A | 310 | 0.15 | 3.6 | −1.6 | 0.14 | 29.0 |
| B | 313 | 0.11 | 2.2 | −4.1 | 0.11 | 15.6 |
| C | 310 | 0.13 | 7.9 | −1.6 | 0.12 | 29.6 |
| D | 323 | 0.07 | 2.3 | −2.2 | 0.08 | 3.0 |

NOTE.—(1) No voltage was applied in a thermostatic bath set up at 85° C. (2) Rating of capacitor: 10 v., 220 μf.

From the above results, it can be understood that the electrolytic capacitor with the electrolyte of the invention produces a markedly improved performance over a wide range of temperature from low to high temperatures. Particularly, the improvement in the tan δ inclination at lower temperatures is surprisingly remarkable. As used herein, tangent δ is the dissipation factor as defined in paragraph 1.8 of RS–205, EIA Standard, page 2, published by the Electronic Industries Association, New York, 1958.

EXAMPLE 2

Monoammonium meleate (30 g.) is dissolved in ethylene glycol (100 ml.) at room temperature to make a solution, which is utilizable as an electrolyte for an electrolytic capacitor. The specific resistance is 120 Ωcm. (20° C). The spark voltage is 110 v.

In view of the fact that the specific resistance attained by any conventional electrolyte using ethylene glycol as the solvent is ordinarily from 250 to 300 Ωcm., the electrolyte in Example 2 may be said to be highly conductive.

The electric properties of aluminum dry electrolytic capacitors using the electrolyte as prepared above (Sample E) and using an electrolyte consisting of ethylene glycol and adipic acid as conventionally employed (Sample F) were comparatively examined with a capacitor element of 33 μf.-35 v. rated). The results are shown in the following Tables 5 and 6.

TABLE 5.—TEMPERATURE CHARACTERISTICS

| | +85° C. | | +25° C. | | −25° C. | |
|---|---|---|---|---|---|---|
| Sample | Change ratio of capacitance, percent | Capacitance loss (Ω μf.) | Change ratio of capacitance, percent | Capacitance loss (Ω μf.) | Change ratio of capacitance, percent | Capacitance loss (Ω μf.) |
| E | +5.7 | 25 | 0 | 42 | −5.5 | 410 |
| F | +13 | 35 | 0 | 130 | −12 | 750 |

TABLE 6.—ENDURANCE TEST

| | Initial value | | | Value after 500 hrs. | | | |
|---|---|---|---|---|---|---|---|
| Sample | Capacitance (μf.) | Capacitance loss (Ω μf.) | Leakage current (μa./min.) | Capacitance (μf.) | Capacitance loss (Ω μf.) | Leakage current (μa./min.) | Appearance |
| E | 37.5 | 41 | 1.2 | 41.3 | 140 | 0.7 | Not changed. |
| F | 36.5 | 130 | 1.1 | 36.6 | 145 | 0.6 | Do. |

NOTE.—A rated voltage was applied in a thermostatic bath set up at 85° C.

EXAMPLE 3

Monoammonium maleate (16 g.) or monosodium maleate (10 g.) is dissolved in dimethylformamide (100 ml.) to make a solution, which is utilizable as an electrolyte for an electrolytic capacitor. The specific resistances and the spark voltages of the electrolyte are shown in Table 7.

TABLE 7

| | Specific resistance (Ω cm.) | | | | Spark voltage (v.) |
|---|---|---|---|---|---|
| Electrolyte | +85° C. | +30° C. | +20° C. | −25° C. | |
| DMF (100 ml.) plus monoammonium maleate (16 g.) | 45 | 74 | 85 | 210 | 100 |
| DMF (100 ml.) plus monosodium maleate (10 g.) | 65 | 90 | 98 | 300 | 100 |

The electric properties of aluminum dry electrolytic capacitors using the electrolytes as prepared above (Sample G: dimethylformamide+monoammonium maleate. Sample H: dimethylformamide+monosodium maleate), using the electrolyte as prepared in Example 2 (Sample E: ethylene glycol+monoammonium maleate) and using an electrolyte consisting of ethylene glycol and adipic acid as conventionally employed (Sample F) were comparatively examined with a capacitor element of 33 μf.-35 v. (rated). The results are shown in the following Tables 8 and 9.

TABLE 8.—TEMPERATURE CHARACTERISTICS

| | +85° C. | | +25° C. | | −25° C. | |
|---|---|---|---|---|---|---|
| Sample | Change ratio of capacitance, percent | Capacitance loss (Ω μf.) | Change ratio of capacitance, percent | Capacitance loss (Ω μf.) | Change ratio of capacitance, percent | Capacitance loss (Ω μf.) |
| E | +5.7 | 25 | 0 | 42 | −5.5 | 410 |
| F | +13 | 35 | 0 | 130 | −12 | 750 |
| G | +5.1 | 40 | 0 | 36 | −4.8 | 77 |
| H | +5.0 | 31 | 0 | 38 | −5.1 | 120 |

TABLE 9.—ENDURANCE TEST

| | Initial value | | | Value after 500 hrs. | | | |
|---|---|---|---|---|---|---|---|
| Sample | Capacitance (μf.) | Capacitance loss (Ω μf.) | Leakage current (μa./min.) | Capacitance (μf.) | Capacitance loss (Ω μf.) | Leakage current (μa./min.) | Appearance |
| E | 37.5 | 41 | 1.2 | 41.3 | 140 | 0.7 | Not changed. |
| F | 36.4 | 130 | 1.1 | 36.6 | 145 | 0.6 | Do. |
| G | 33.6 | 36 | 1.4 | 36.2 | 90 | 0.9 | Do. |
| H | 34.1 | 38 | 1.4 | 34.8 | 42 | 0.9 | Do. |

NOTE.—A rated voltage was applied in a thermostatic bath set up at 85° C.

What is claimed is:

1. A capacitor electrolyte consisting essentially of N-methylformamide solven and at least 1% by weight of an acid maleate solute consisting essentially of equimolar amounts of maleic acid with ammonia, amine or alkali metal.

2. The electrolyte of claim 1 wherein the solute consists essentially of ammonium acid maleate.

References Cited

UNITED STATES PATENTS

| | | | |
|---|---|---|---|
| 3,696,037 | 10/1972 | Lagercrantz et al. | 252—62.2 |
| 3,719,602 | 3/1973 | Anderson et al. | 252—62.2 |
| 3,293,506 | 12/1966 | Chesnot | 252—62.2 X |
| 3,518,499 | 6/1970 | Shephard et al. | 252—62.2 X |
| 3,223,639 | 12/1965 | Powers et al. | 252—62.2 |
| 3,588,625 | 6/1971 | Kihara et al. | 252—62.2 X |

OTHER REFERENCES

Weiss et al.: "American Chemical Society," vol. 45, p. 2348, 1923.

Maillols et al.: "Chem. Abstracts," vol. 71, p. 17366, 1969.

Buchner: "Annalen Der Chemie," vol. 49, p. 689, 1844.

OSCAR R. VERTIZ, Primary Examiner

J. COOPER, Assistant Examiner

U.S. Cl. X.R.

317—230